US012010489B2

(12) United States Patent
Wang (10) Patent No.: US 12,010,489 B2
(45) Date of Patent: Jun. 11, 2024

(54) UWB-BASED LOW-DELAY LOSSLESS DIGITAL AUDIO

(71) Applicant: Fengshuo Wang, Guangdong (CN)

(72) Inventor: Fengshuo Wang, Guangdong (CN)

( * ) Notice: Subject to any disclaimer, the term of this patent is extended or adjusted under 35 U.S.C. 154(b) by 159 days.

(21) Appl. No.: 17/882,594

(22) Filed: Aug. 7, 2022

(65) Prior Publication Data

US 2023/0412975 A1 Dec. 21, 2023

(30) Foreign Application Priority Data

Jun. 20, 2022 (CN) .......................... 202221533222.6

(51) Int. Cl.
*H04R 3/00* (2006.01)
*H04W 76/10* (2018.01)

(52) U.S. Cl.
CPC .............. *H04R 3/00* (2013.01); *H04W 76/10* (2018.02); *H04R 2420/07* (2013.01)

(58) Field of Classification Search
CPC ......... H04W 4/029; H04W 4/33; H04W 4/80; H04W 4/025; H04W 76/10; H04W 76/14; H04W 76/15; H04W 84/18; H04R 2420/07; H04R 1/083; H04R 1/326; H04R 1/403; H04R 1/406; H04R 29/005; H04R 1/1041; H04R 27/00; H04R 29/007; H04R 3/00; H04R 5/02; H04S 2400/11; H04S 7/30; H04B 1/7172; H04B 1/7174; H04B 1/38; H04B 1/3888; H04B 1/713; H04B 1/7163; H04B 1/7176; H04B 1/719; H04B 2203/5495; H04B 3/542; H04B 1/69; H04L 25/0204; H04L 25/4902; H04L 27/2647; H04L 1/0071; H04L 1/04; H04L 1/0668; H04L 25/0228; H04L 27/2602; H04L 27/2613; H04L 27/2626; H04L 5/0023; H04L 5/0042; H04L 5/0048; H04L 5/0053; H04L 5/023; H04L 2025/03414; H04L 27/2614; H04L 27/26526; H04L 65/611
USPC .................................. 381/92, 56–58; 700/94
See application file for complete search history.

(56) References Cited

U.S. PATENT DOCUMENTS

| | | | |
|---|---|---|---|
| 5,361,070 A * | 11/1994 | McEwan | A61B 5/0507 342/21 |
| 11,240,635 B1 * | 2/2022 | Eckert | H04W 4/33 |
| 2008/0171561 A1 * | 7/2008 | Irony | H04W 76/15 455/466 |
| 2020/0233397 A1 * | 7/2020 | Bello | G05B 19/4184 |

(Continued)

*Primary Examiner* — Lun-See Lao (57) ABSTRACT

A UWB-based low-delay lossless digital audio transmission unit, including an audio input module, an audio processing module, a radio frequency transceiving module and a UWB processing module. The audio processing module is in signal connection with the audio input module and receives a first digital audio signal from the audio input module and transmits the first digital audio signal to the UWB processing module. The UWB processing module is connected with the audio processing module and the radio frequency transceiving module. The radio frequency transceiving module is connected with another digital audio transmission unit to send it the first digital audio signal processed by the UWB processing module and to receive a second digital audio signal from the another digital audio transmission unit. A system and an electronic device having the UWB-based low-delay lossless digital audio transmission unit are also provided.

9 Claims, 5 Drawing Sheets

(56) References Cited

U.S. PATENT DOCUMENTS

2021/0066799 A1\* 3/2021 Avser ................. H01Q 5/25
2021/0377657 A1\* 12/2021 Cnaan ............... H01Q 21/205

\* cited by examiner

A: I2S data processing module
B: I2S input data processing
C: I2S output data processing
D: Power supply module
E: UWB data cache
F: Status information interface module

FIG.1

A: I2S data processing module
B: I2S input data processing
C: I2S output data processing
D: Power supply module Transmitting device E: Status information interface module
F: Reference clock source
G: I2S data processing module
H: I2S input data processing I: I2S output data processing
J: Power supply module Receiving device K: Status information interface module

A: A: Status information interface module
B: Control and configuration interface

FIG.5

UWB-BASED LOW-DELAY LOSSLESS DIGITAL AUDIO

BACKGROUND OF THE INVENTION

The present utility model relates to the technical field of wireless communications, and particularly to a UWB-based low-delay lossless digital audio transmission unit and system, and an electronic device.

The development and application of wireless technology bring convenience to human life. The greatest characteristic of wireless technology is the absence of original wired connection, which brings benefits to the users. Wireless transmission directly reduces the constraints of wiring and distance. Connections between devices can be added or changed by establishing new connections only through a simple operation, without rewiring. Wireless transmission encompasses many transmission techniques and standards, such as Bluetooth, Wi-Fi, ZigBee, NFC, IrDA, and the like which are common in life.

Bluetooth and Wi-Fi are commonly used in wireless audio transmission systems, but these techniques have more or less some defects for specific applications. Bluetooth features short transmission distance and limited bandwidth, and is thus improper for lossless audio data transmission. Such defects may lead to high transmission delay in low-delay lossless audio transmission, limiting the application range of Bluetooth. Wi-Fi is mainly used for file transmission and is capable of transmitting lossless audios. However, low-delay lossless audio transmission applications require a wireless router, which poses problems such as complicated settings, high power consumption, crowded components causing mutual interference, and difficulties in synchronization between audio channels. As such, wireless audio transmission system can only realize one-to-one transmission, that is, realizing audio transmission between one master device and one slave device, rather than one-to-multiple or multiple-to-one audio transmission. As a result, such audio transmission systems can hardly be suitable for various scenarios in real life and work.

With the development of wireless transmission technology, a variety of new wireless transmission techniques emerged in recent years, making it possible to realize high-speed wireless data transmission within a short distance. For example, a current UWB wireless transmission technology can provide a data transmission rate of up to 480 Mbps at a frequency between 3.1 GHz and 10.6 GHz, which provides a good technology basis to solve the above-mentioned problems.

BRIEF SUMMARY OF THE INVENTION

In view of the shortcomings in the prior art, the present utility model is intended to provide a UWB-based low-delay lossless digital audio transmission unit and system, and an electronic device, for realizing one-to-one application as well as one-to-multiple or multiple-to-one audio transmission, thereby ensuring the applicability of the audio transmission systems in various scenarios in real life and work.

In order to achieve the above-mentioned objective, the present utility model adopts the following technical schemes:

Provided is a UWB-based low-delay lossless digital audio transmission unit, comprising an audio input module, an audio processing module, a radio frequency transceiving module and a UWB processing module, wherein the audio input module is configured to input an audio signal, to convert the audio signal into a first digital audio signal in I2S format, and to output the first digital audio signal;

the audio processing module is in signal connection with the audio input module, and is configured to receive the first digital audio signal in I2S format output by the audio input module, to process the first digital audio signal and to transmit the processed first digital audio signal to the UWB processing module;

the UWB processing module is in signal connection with both the audio processing module and the radio frequency transceiving module simultaneously, and is configured to process the first digital audio signal received from the audio processing module and a second digital audio signal received from the radio frequency transceiving module;

the radio frequency transceiving module is further in signal connection with another digital audio transmission unit, and is configured to send, to the another digital audio transmission unit, the first digital audio signal processed by the UWB processing module, and further configured to receive the second digital audio signal sent by the another digital audio transmission unit to the UWB processing module.

Furthermore, between the audio processing module and the UWB processing module are further provided in sequence: an I2S interface module, an I2S data processing module and an FIFO buffer; the I2S interface module is electrically connected with the audio signal processing module, and is configured to acquire the first digital audio signal or output the second digital audio signal; the I2S data processing module is electrically connected with the I2S interface module, and is configured to process the acquired first digital audio signal; the FIFO buffer is simultaneously in signal connection with the UWB processing module and the I2S data processing module.

Furthermore, the FIFO buffer is communicatively connected with the UWB processing module through a real-time transport protocol stack.

Furthermore, the digital audio transmission unit further comprises a clock module; the clock module is configured to provide a master clock signal to the I2S interface module.

Furthermore, the digital audio transmission unit further comprises a power supply module configured to supply electric energy to the digital audio transmission unit.

Furthermore, a status information interface module is further connected to the UWB processing module, and the status information interface module is configured to connect a microprocessor.

Furthermore, the digital audio transmission unit further comprises an audio output module; the audio output module is in signal connection with the audio processing module, and is configured to output the second digital audio signal.

The present utility model further provides a UWB-based low-delay lossless digital audio transmission system, comprising a transmitting device and a receiving device, wherein each of the transmitting device and the receiving device has the UWB-based low-delay lossless digital audio transmission unit described above.

The present utility model further provides an electronic device, comprising a circuit board having the UWB-based low-delay lossless digital audio transmission unit.

Beneficial Effects

The combination of the UWB processing module, the radio frequency transceiving module, the audio processing module and the audio input module takes advantages of the high bandwidth and low power consumption of UWB transmission, and solves the bandwidth and delay problems in Bluetooth transmission and the high power consumption and EMI resistance problems in Wi-Fi transmission. The present utility model can realize the bidirectional audio transmission between a master device and a slave device as well as the one-to-multiple or multiple-to-one audio transmission, thus ensuring the applicability of the audio transmission systems in various scenarios in real life and work.

DETAILED DESCRIPTION OF THE INVENTION

Embodiments of the present utility model are described in details below, with preferred examples being illustrated in the accompanying drawings, where the same or similar reference numerals indicate the same or similar elements or elements having the same or similar functions throughout all the drawings. The embodiments described below with reference to the accompanying drawings are exemplary, and are intended to explain the present utility model, and should not be construed as a limitation to the present utility model.

In the description of the present utility model, it should be understood that orientations or positional relationships indicated by the terms "length", "width", "upper", "lower", "front", "rear", "left", "right", "vertical", "horizontal", "top", "bottom", "inner", "outer", and the like are orientations or positional relationships as shown in the drawings, and are only for the purpose of facilitating and simplifying the description of the present utility model instead of indicating or implying that devices or elements indicated must have particular orientations, or be constructed and operated in the particular orientations. Such terms shall not be construed as limiting the present utility model.

In addition, the terms "first" and "second" are only for the purpose of description, and may not be construed as indicating or implying the relative importance or implicitly indicating the number of technical features indicated. Thus, features defined by "first" and "second" may explicitly or implicitly include one or more of that feature. In the description of the present utility model, "plurality" refers to two or more, unless otherwise explicitly and specifically defined.

In the embodiments of the present utility model, unless otherwise explicitly specified and limited, the terms such as "mount", "connect", "link", "fix" and the like should be interpreted in a broad sense. For example, it may be a fixed connection, a detachable connection or integration; may be a mechanical connection or an electric connection; or may be a direct connection, an indirect connection by means of an intermediate, an internal interconnection of two elements or an interaction of two elements. For those of ordinary skill in the art, the specific meanings of the above terms in the present utility model can be construed according to specific situations.

Referring to FIG. 1 to FIG. 5, a UWB-based low-delay lossless digital audio transmission unit is provided, comprising an audio input module, an audio processing module, a radio frequency transceiving module and a UWB processing module. The audio input module is configured to input an audio signal, to convert the audio signal into a first digital audio signal in I2S format, and to output the first digital audio signal. The audio processing module is in signal connection with the audio input module, and is configured to receive the first digital audio signal in I2S format output by the audio input module, to process the first digital audio signal and then transmit the processed first digital audio signal to the UWB processing module. The UWB processing module is simultaneously in signal connection with the audio processing module and the radio frequency transceiving module, and is configured to process the first digital audio signal received from the audio processing module and a second digital audio signal received from the radio frequency transceiving module; the radio frequency transceiving module is further in signal connection with another digital audio transmission unit, and is configured to send, to the another digital audio transmission unit, the first digital audio signal processed by the UWB processing module, and further configured to receive the second digital audio signal in I2S format sent by the another digital audio transmission unit to the UWB processing module. In this embodiment, the radio frequency transceiving module is an antenna array mounted on the UWB processing module, the audio processing module is an audio codec, and the UWB processing module is a UWB chip. Specifically, the UWB chip includes, but is not limited to, GT1000 chip of Shenzhen Giant Microelectronics. The UWB processing module and the radio frequency transceiving module are connected to form a UWB wireless transmission unit.

Figure 1:
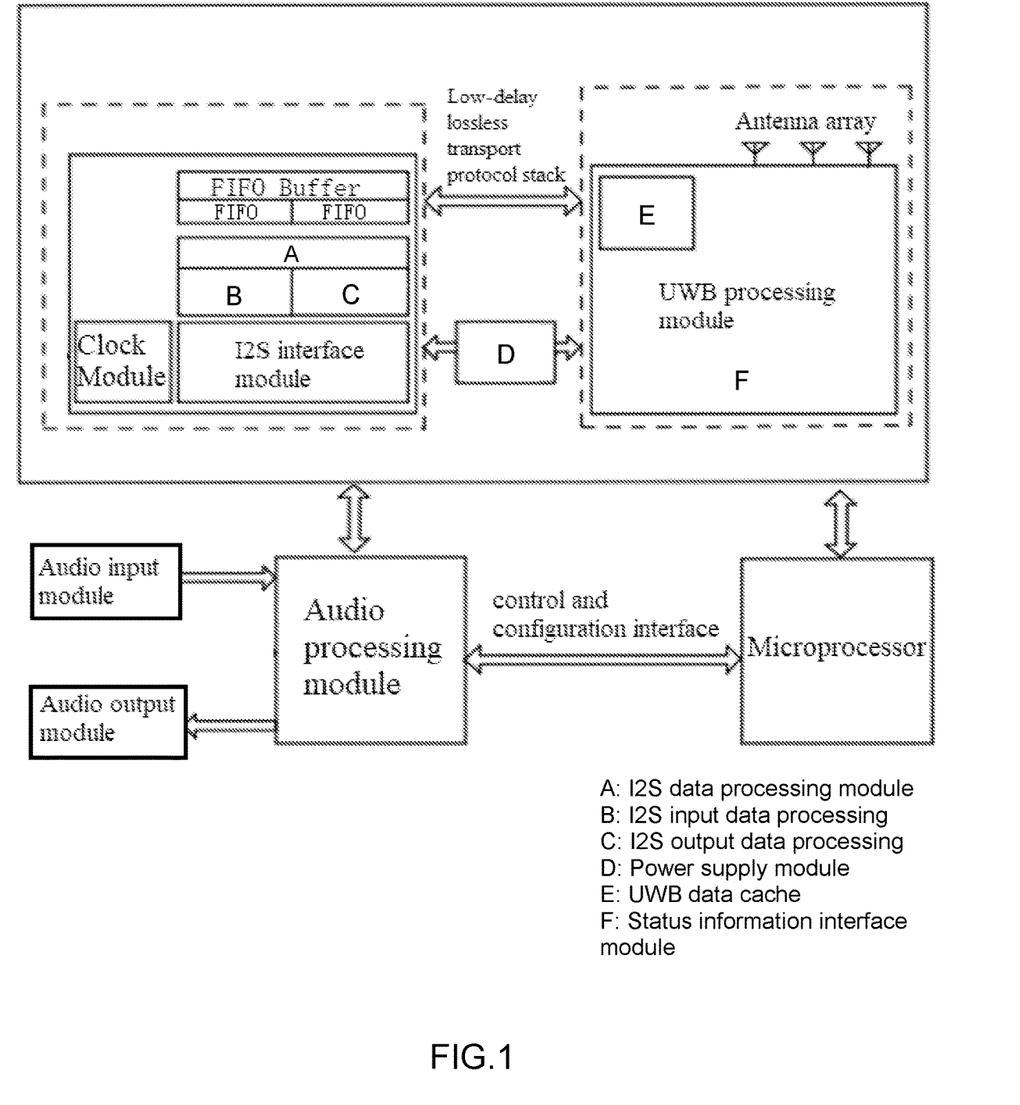
FIG. 1 is a schematic diagram illustrating the principle of the present utility model.

In one embodiment, between the audio processing module and the UWB processing module are further provided in sequence an I2S interface module, an I2S data processing module and an FIFO buffer. The I2S interface module is electrically connected with the audio signal processing module, and is configured to acquire the first digital audio signal or output the second digital audio signal. The I2S data processing module is electrically connected with the I2S interface module, and is configured to process the acquired first digital audio signal. The FIFO buffer is simultaneously in signal connection with the UWB processing module and the I2S data processing module, and is configured to receive and buffer the second digital audio signal and send the second digital audio signal to the I2S data processing module for processing. Furthermore, the I2S interface module is a standard I2S bidirectional digital interface, which supports data formats including but not limited to a bidirectional 44.1-192 kHz sampling rate and a bit depth of 16-32 bits, and supports TDM input/output. On one hand, the I2S data processing module is configured to pack the first digital audio signal input from an input port of the I2S interface module; the first digital audio signal specifically comprising data such as first audio data and first audio information. On the other hand, the I2S data processing module is further configured to unpack the second digital audio signal input by the UWB processing module, where the second digital audio signal specifically, at this time, comprising packed data such as second audio data and second audio information; and the I2S data processing module is also configured to output audio signals corresponding to sampling and channel from an output port of the I2S interface module according to the second audio information in the second digital audio signal.

In one embodiment, the FIFO buffer is communicatively connected to the UWB processing module through a real-time transport protocol stack. The FIFO buffer can buffer the received first digital audio signal and second digital audio signal. The FIFO buffer ensures low delay and lossless continuity of audio data during error correction retransmission in wireless transmission. The size of the FIFO buffer is dynamically adjusted according to a sampling rate and the number of channels. An excessively great size of the FIFO buffer will affect the delay, while an excessively small size will cause staccato.

In one embodiment, the digital audio transmission unit further comprises a clock module. The clock module is configured to provide a master clock signal to the I2S interface module. The master clock signal comprises a reference clock source and a VCXO clock source. Specifically, the clock module is electrically connected with the audio processing module, and is configured to guarantee the accuracy and low jitter of the output clock when an I2S interface outputs audio data, to serve as a clock reference to identify an input sampling rate and a bit depth when the I2S interface inputs audio data, and to serve as a clock reference for inter-channel synchronization when there are multiple channels.

In one embodiment, the digital audio transmission unit further comprises a power supply module configured to supply electric energy to the digital audio transmission unit. In some other embodiments, the power supply module is further configured to manage and control the power consumption of the entire digital audio transmission unit, and the power supply module is electrically connected with both the UWB processing module and the I2S data processing module simultaneously.

In one embodiment, the UWB processing module is further connected with a status information interface module. The status information interface module is configured to connect a microprocessor. Furthermore, the microprocessor is further provided with an interface for connection with the audio processing module. The status information interface module is configured to facilitate the microprocessor to acquire control information and status information such as relative position and angle, audio sampling rate, audio sampling bit depth, number of channels and volume from the UWB processing module. In this embodiment, the status information interface module includes, but is not limited to, the following types: I2C interface, UART interface, SPI interface, etc. The microprocessor is a single-chip microcomputer.

In one embodiment, the digital audio transmission unit further comprises an audio output module. The audio output module is in signal connection with the audio processing module and is configured to output the second digital audio signal. In this embodiment, the audio output module is a loudspeaker.

Figure 2:
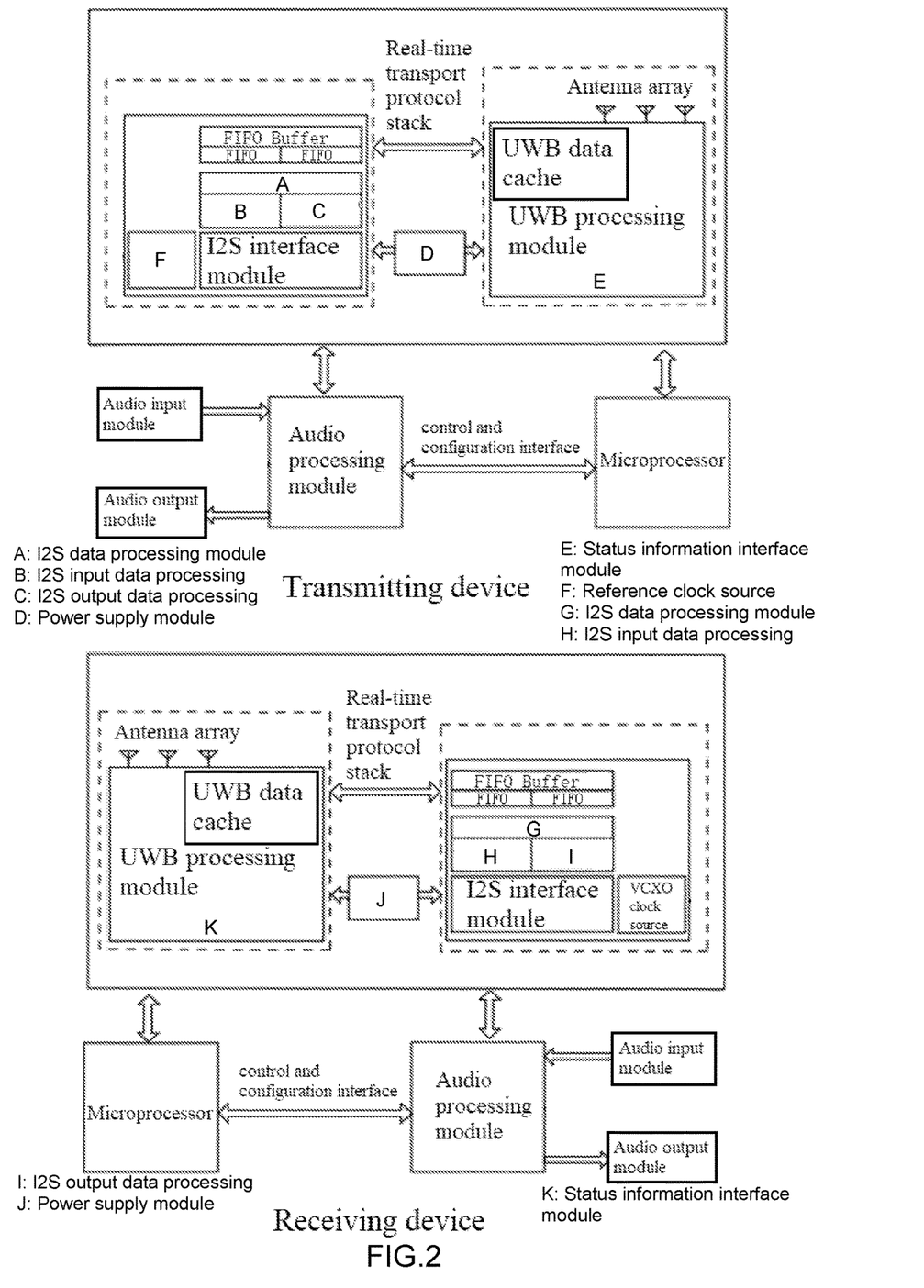
FIG. 2 is a schematic diagram illustrating the principle of a digital audio transmission system of the present utility model.
Figure 3:
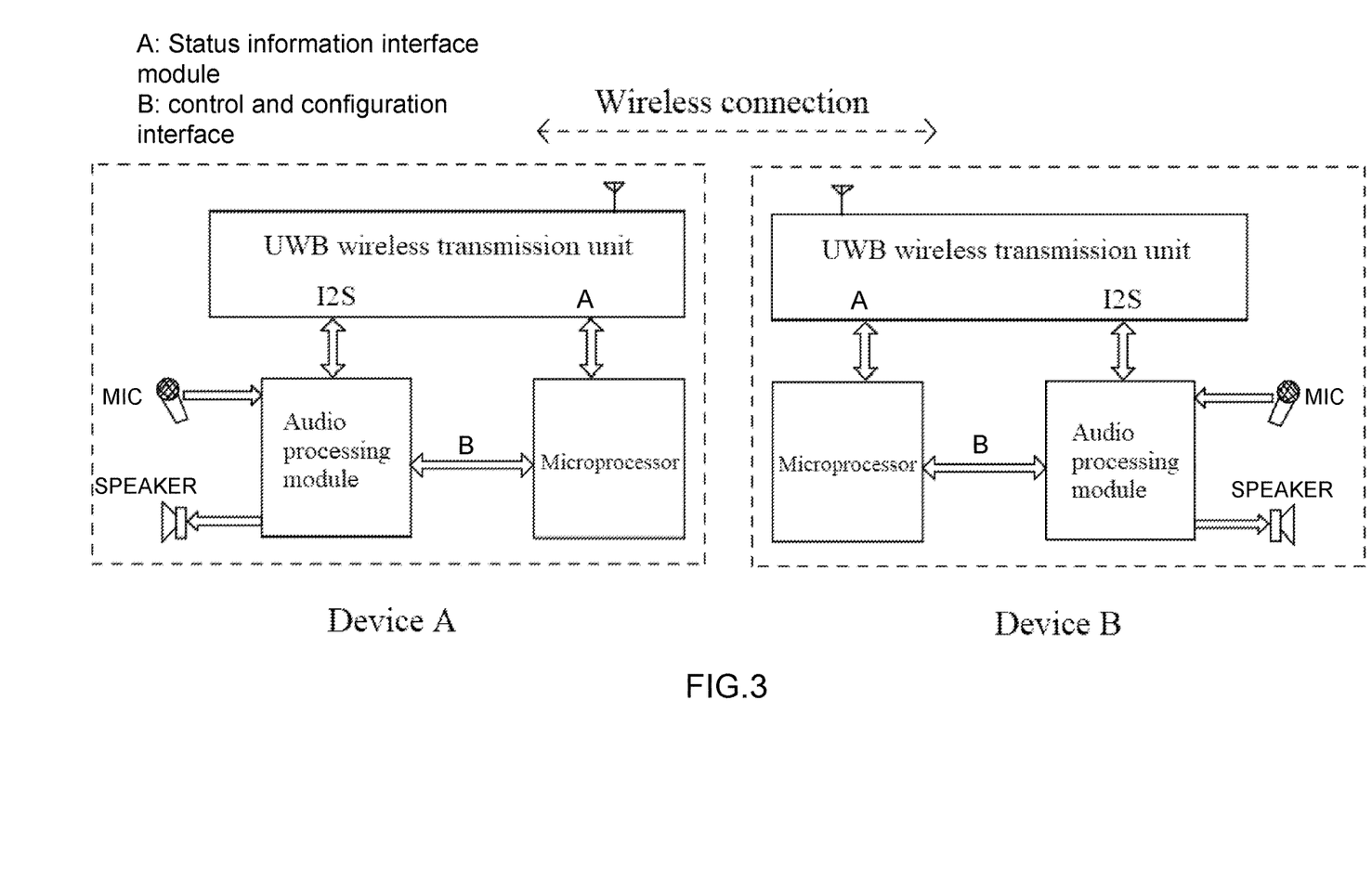
FIG. 3 is a simple schematic diagram illustrating one-to-one wireless audio transmission in the present utility model.
Figure 4:
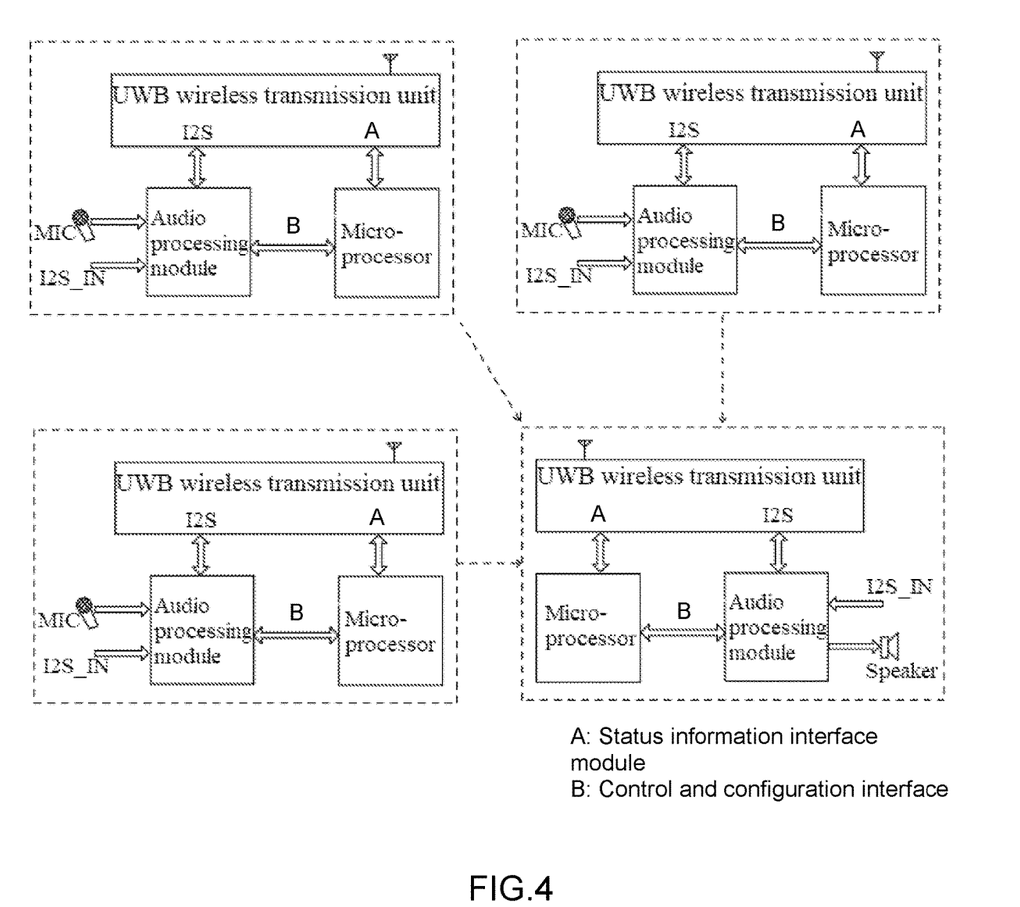
FIG. 4 is a simple schematic diagram illustrating multiple-to-one wireless audio transmission in the present utility model.
Figure 5:
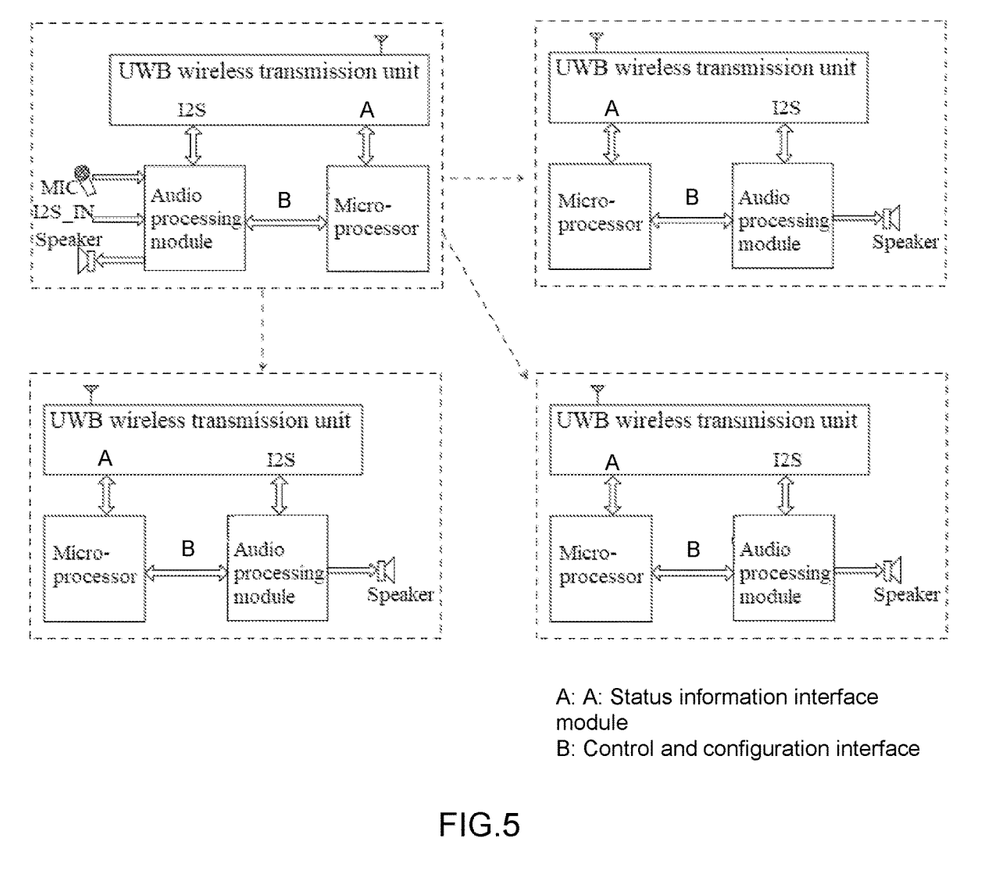
FIG. 5 is a simple schematic diagram illustrating one-to-multiple wireless audio transmission in the present utility model.

The present utility model further provides a UWB-based digital audio transmission system, comprising a transmitting device and a receiving device, wherein each of the transmitting device and the receiving device has the UWB-based low-delay lossless digital audio transmission unit described above. In this embodiment, when the digital audio transmission system is in operation, the clock module on the transmitting device provides a reference clock source, and the clock module on the receiving device provides an adjustable VCXO clock source for tracking a reference clock. A clock signal of the clock module on the transmitting device and a clock signal of the clock module on the receiving device are determined to be synchronized when the transceiving rates of the clock module on the transmitting device and the clock module on the receiving device are consistent, and when also taken consideration of the status information fed back by the FIFO buffer.

The present utility model further provides an electronic device, comprising a circuit board having the UWB-based low-delay lossless digital audio transmission unit.

Principle: The process that the digital audio transmission unit receives a data signal is as follows: The antenna array receives the second digital audio signal sent to the UWB processing module by the another digital audio transmission unit; the UWB processing module receives valid data conforming to the UWB specification; the received valid data are written into a data cache, transmitted to the FIFO buffer through the real-time transport protocol stack, and unpacked through the I2S data processing module; after the clock module synchronizes the clock, the unpacked data are output from the I2S interface to the audio processing module for processing according to an audio sampling rate and bit depth in a data packet, where a digital signal is converted into an electric signal; the electric signal is transmitted to the outside through the loudspeaker in a manner of an acoustic signal.

The process that the digital audio transmission unit sends a data signal is as follows: The audio input module inputs an audio signal, converts the audio signal into a first digital audio signal in I2S format, and outputs the first digital audio signal to the audio processing module; the audio processing module processes the received first digital audio signal and inputs the first digital audio signal to the I2S data processing module through the I2S interface; the data processing module packs the received data, and the packed data includes audio data, sampling rate, bit depth, serial numbers of channels etc; the packed data are transmitted to the FIFO buffer for buffering and then transmitted to the UWB processing module through the real-time transport protocol stack; the UWB processing module buffers the received data, conducts baseband radio frequency processing, modulates a wireless signal according to the UWB specification, and conducts radio frequency output through the antenna array.

The above-mentioned embodiments are only a part of the preferred specific embodiments of the present utility model, and the usual changes and substitutions by those skilled in the art within the scope of the technical scheme of the present utility model shall fall within the protection scope of the present utility model.

What is claimed is:

1. A UWB-based low-delay lossless digital audio transmission unit, comprising an audio input module, an audio processing module, a radio frequency transceiving module and a UWB processing module, wherein
the audio input module is configured to input an audio signal, to convert the audio signal into a first digital audio signal in I2S format, and to output the first digital audio signal;
the audio processing module is in signal connection with the audio input module, and is configured to receive the first digital audio signal in I2S format output by the audio input module, to process the first digital audio signal and to transmit the processed first digital audio signal to the UWB processing module;
the UWB processing module is in signal connection with both the audio processing module and the radio frequency transceiving module simultaneously, and is configured to process the first digital audio signal received from the audio processing module and a second digital audio signal received from the radio frequency transceiving module;

the radio frequency transceiving module is further in signal connection with another digital audio transmission unit, and is configured to send, to the another digital audio transmission unit, the first digital audio signal processed by the UWB processing module, and further configured to receive the second digital audio signal in I2S format sent by the another digital audio transmission unit to the UWB processing module.

2. The UWB-based low-delay lossless digital audio transmission unit according to claim 1, wherein between the audio processing module and the UWB processing module are further provided in sequence: an I2S interface module, an I2S data processing module and an FIFO buffer; the I2S interface module is electrically connected with the audio signal processing module, and is configured to acquire the first digital audio signal or output the second digital audio signal; the I2S data processing module is electrically connected with the I2S interface module, and is configured to process the acquired first digital audio signal; the FIFO buffer is simultaneously in signal connection with the UWB processing module and the I2S data processing module.

3. The UWB-based low-delay lossless digital audio transmission unit according to claim 2, wherein the FIFO buffer is communicatively connected with the UWB processing module through a real-time transport protocol stack.

4. The UWB-based low-delay lossless digital audio transmission unit according to claim 3, wherein the digital audio transmission unit further comprises a clock module; the clock module is configured to provide a master clock signal to the I2S interface module.

5. The UWB-based low-delay lossless digital audio transmission unit according to claim 4, wherein the digital audio transmission unit further comprises a power supply module configured to supply electric energy to the digital audio transmission unit.

6. The UWB-based low-delay lossless digital audio transmission unit according to claim 1, wherein a status information interface module is further connected to the UWB processing module, and the status information interface module is configured to connect a microprocessor.

7. The UWB-based low-delay lossless digital audio transmission unit according to claim 1, wherein the digital audio transmission unit further comprises an audio output module; the audio output module is in signal connection with the audio processing module and is configured to output the second digital audio signal.

8. A UWB-based low-delay lossless digital audio transmission system, comprising a transmitting device and a receiving device, wherein each of the transmitting device and the receiving device has the UWB-based low-delay lossless digital audio transmission unit according to claim 1.

9. An electronic device, comprising a circuit board having the UWB-based low-delay lossless digital audio transmission unit according to claim 1.

* * * * *